Figure 7:
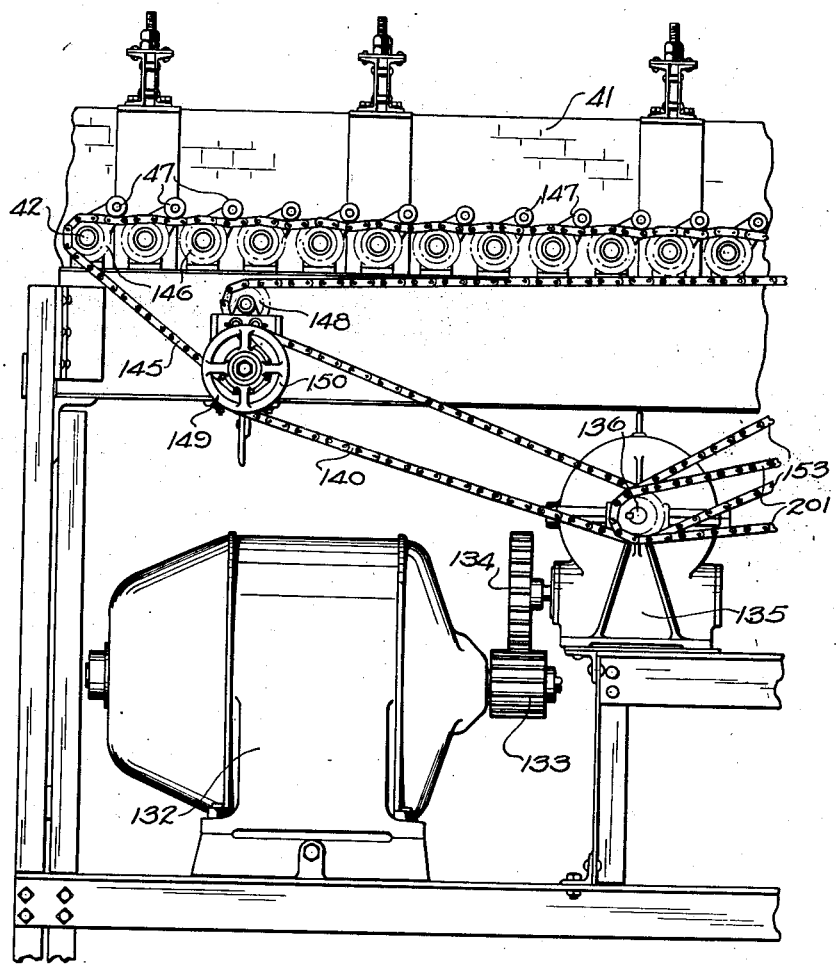

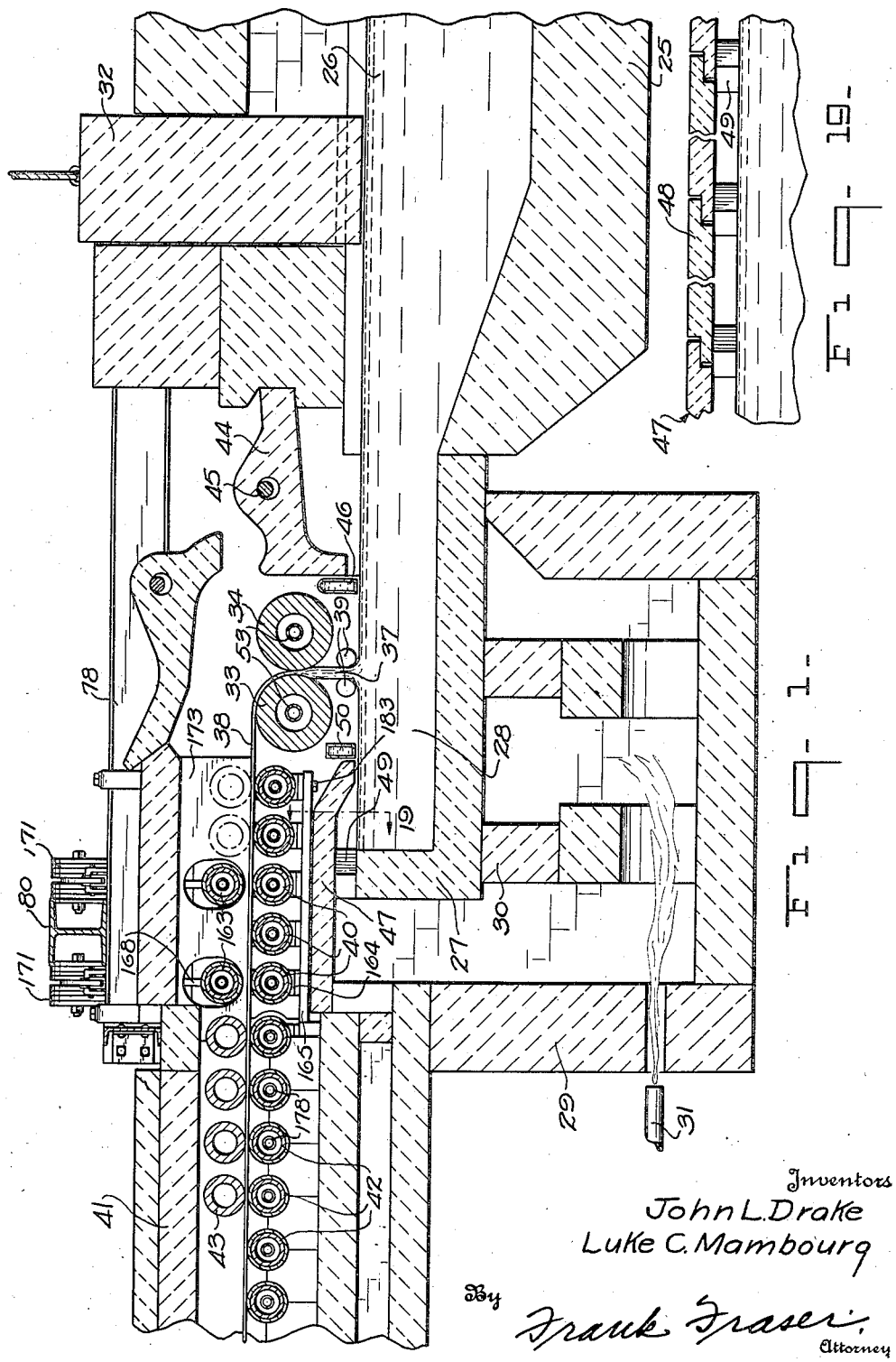

May 10, 1932.                J. L. DRAKE ET AL                1,857,809
                PROCESS AND APPARATUS FOR PRODUCING SHEET GLASS
                Filed Aug. 20, 1927          9 Sheets-Sheet 2
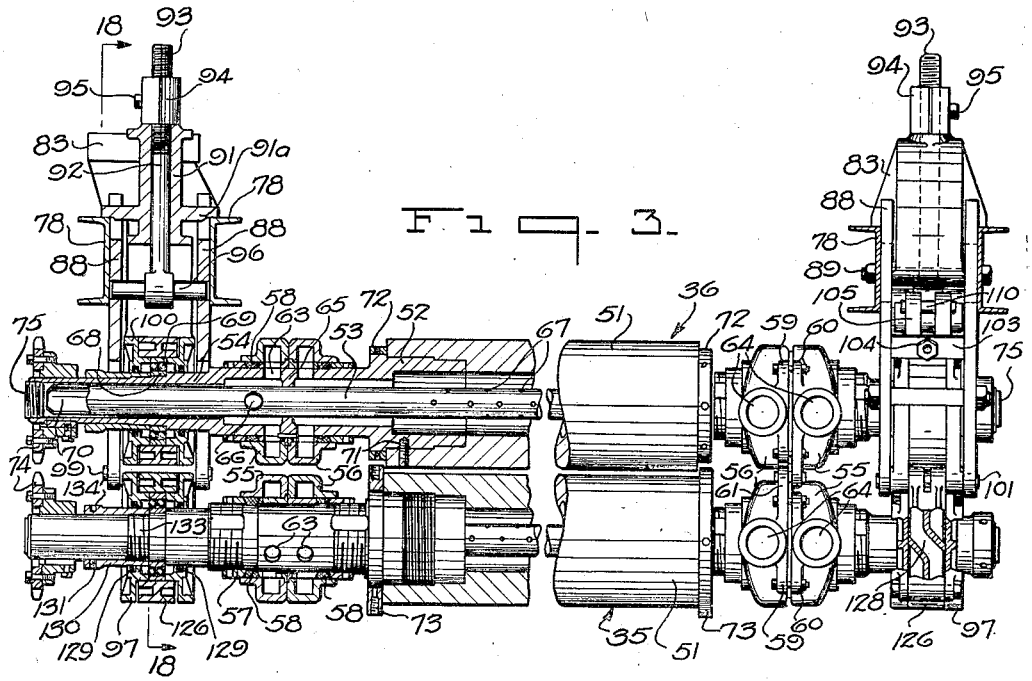
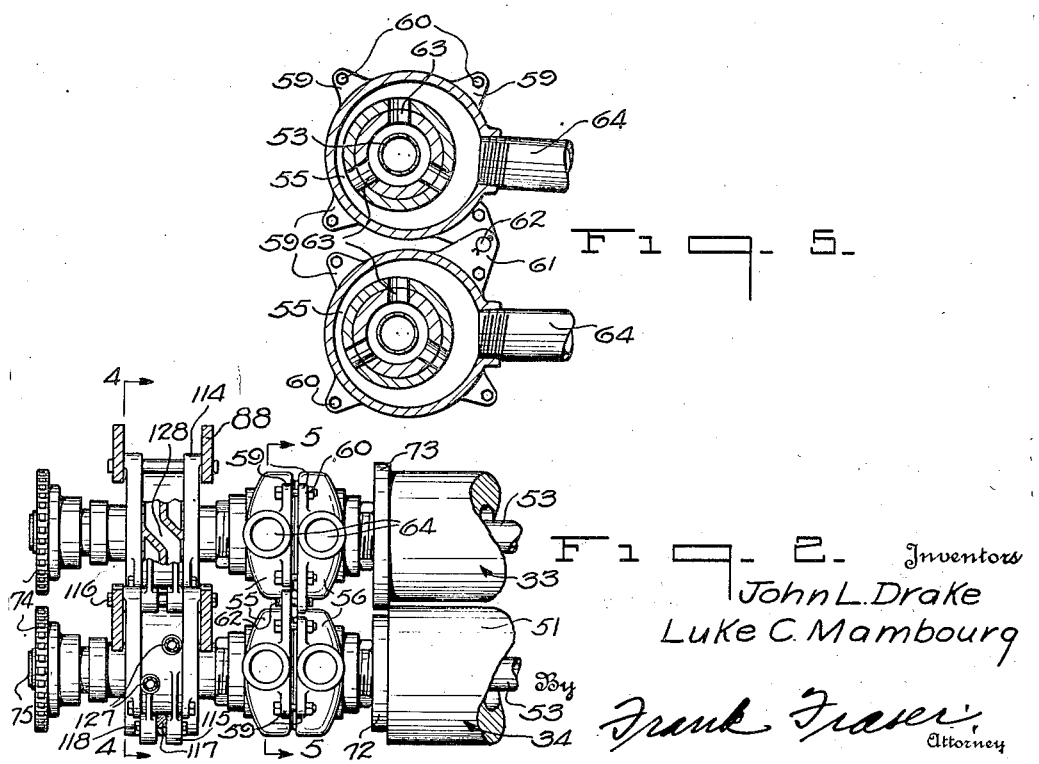
Inventors
John L. Drake
Luke C. Mambourg
By Frank Fraser
Attorney

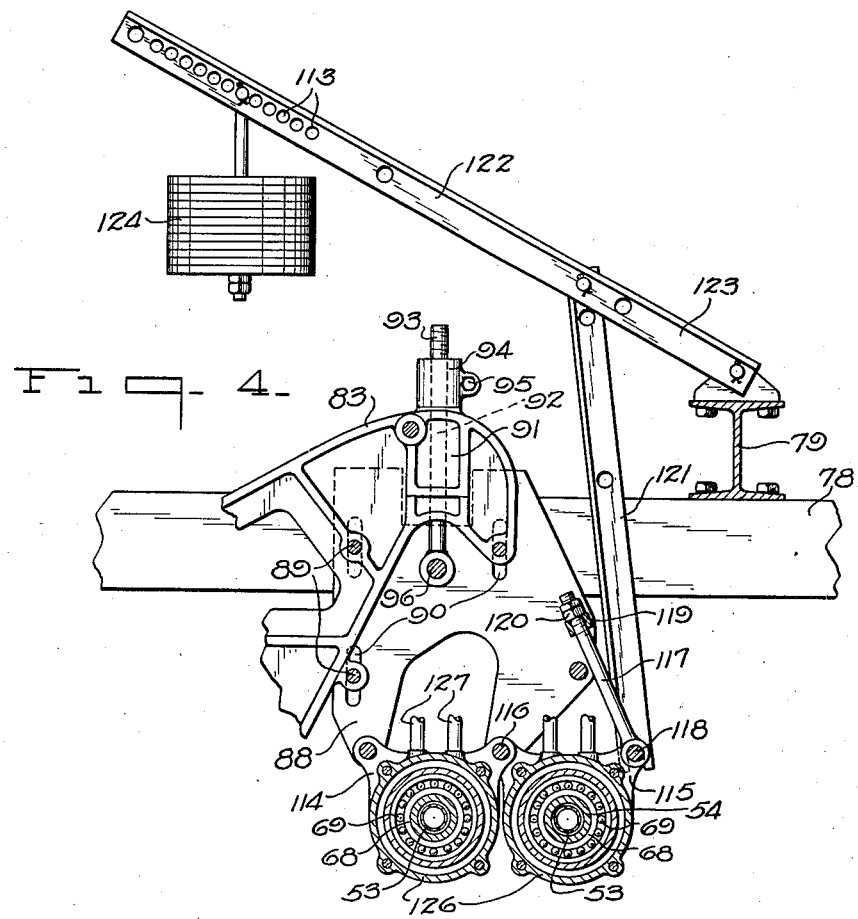
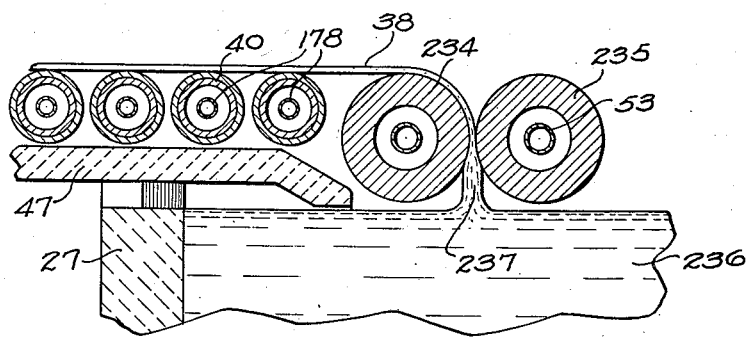

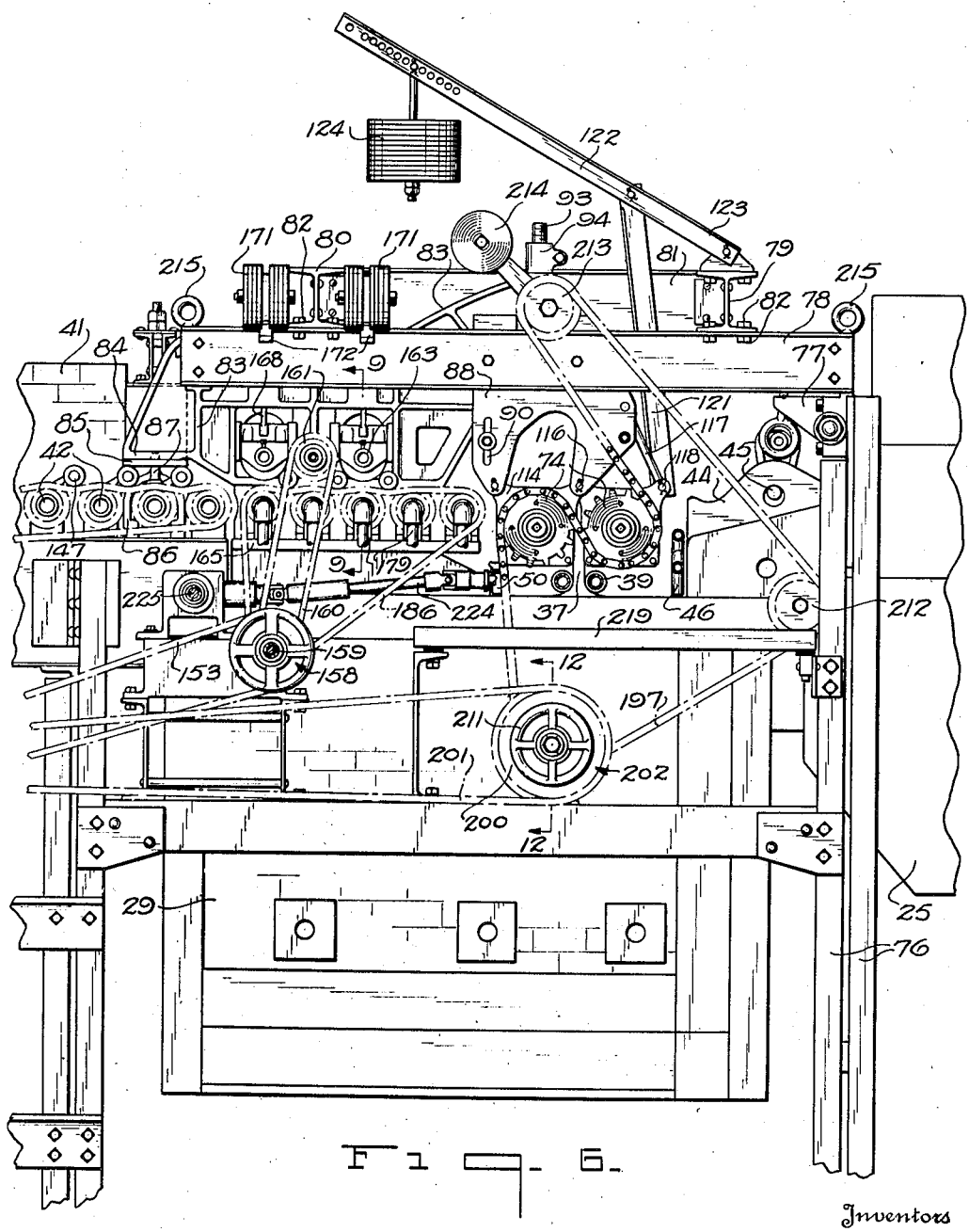

May 10, 1932.  J. L. DRAKE ET AL  1,857,809

PROCESS AND APPARATUS FOR PRODUCING SHEET GLASS

Filed Aug. 20, 1927  9 Sheets-Sheet 5

Inventors
John L. Drake
Luke C. Mambourg

By Frank Fraser
Attorney

May 10, 1932.  J. L. DRAKE ET AL  1,857,809
PROCESS AND APPARATUS FOR PRODUCING SHEET GLASS
Filed Aug. 20, 1927  9 Sheets-Sheet 6
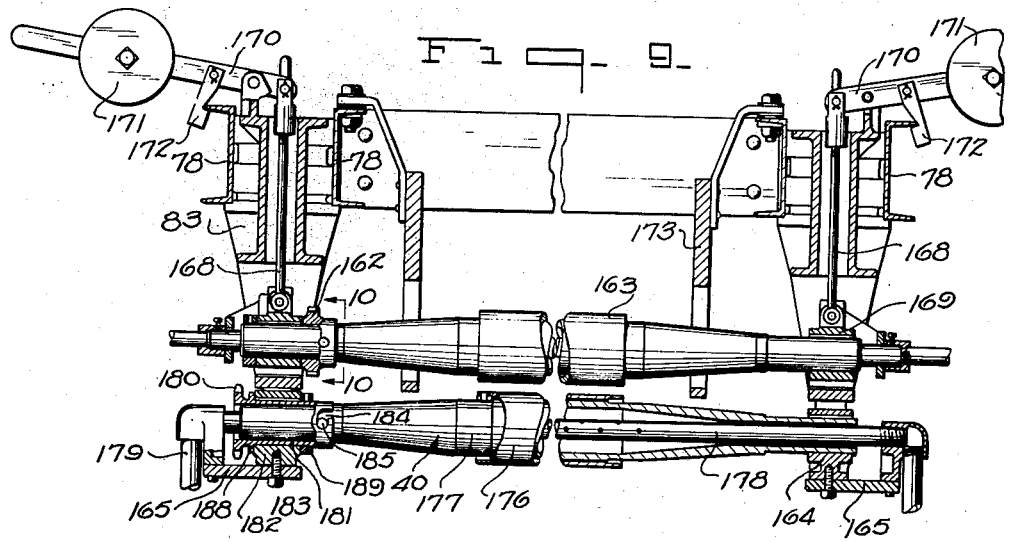
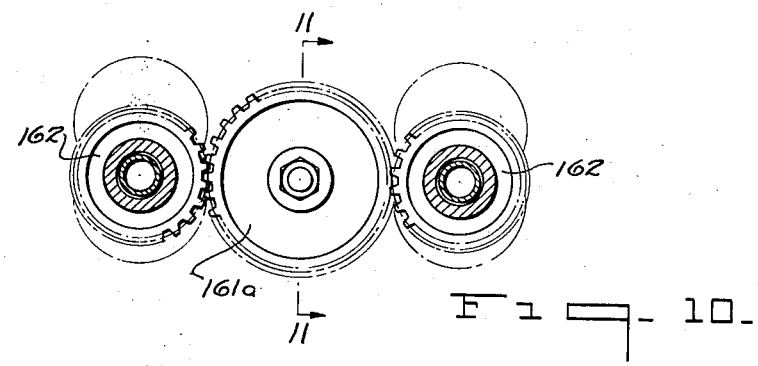
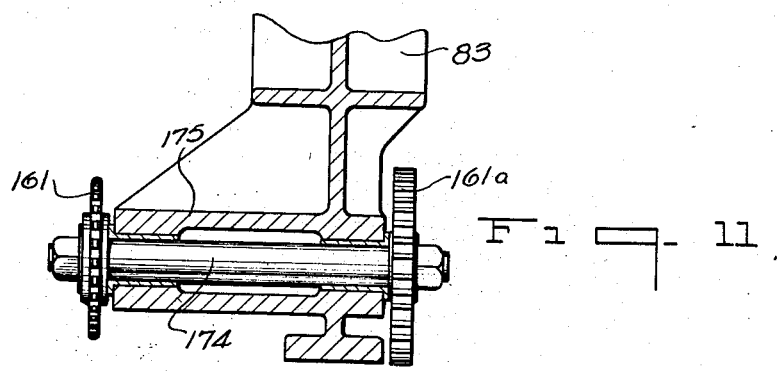
Inventors
John L. Drake
Luke C. Mambourg
By Frank Fraser
Attorney

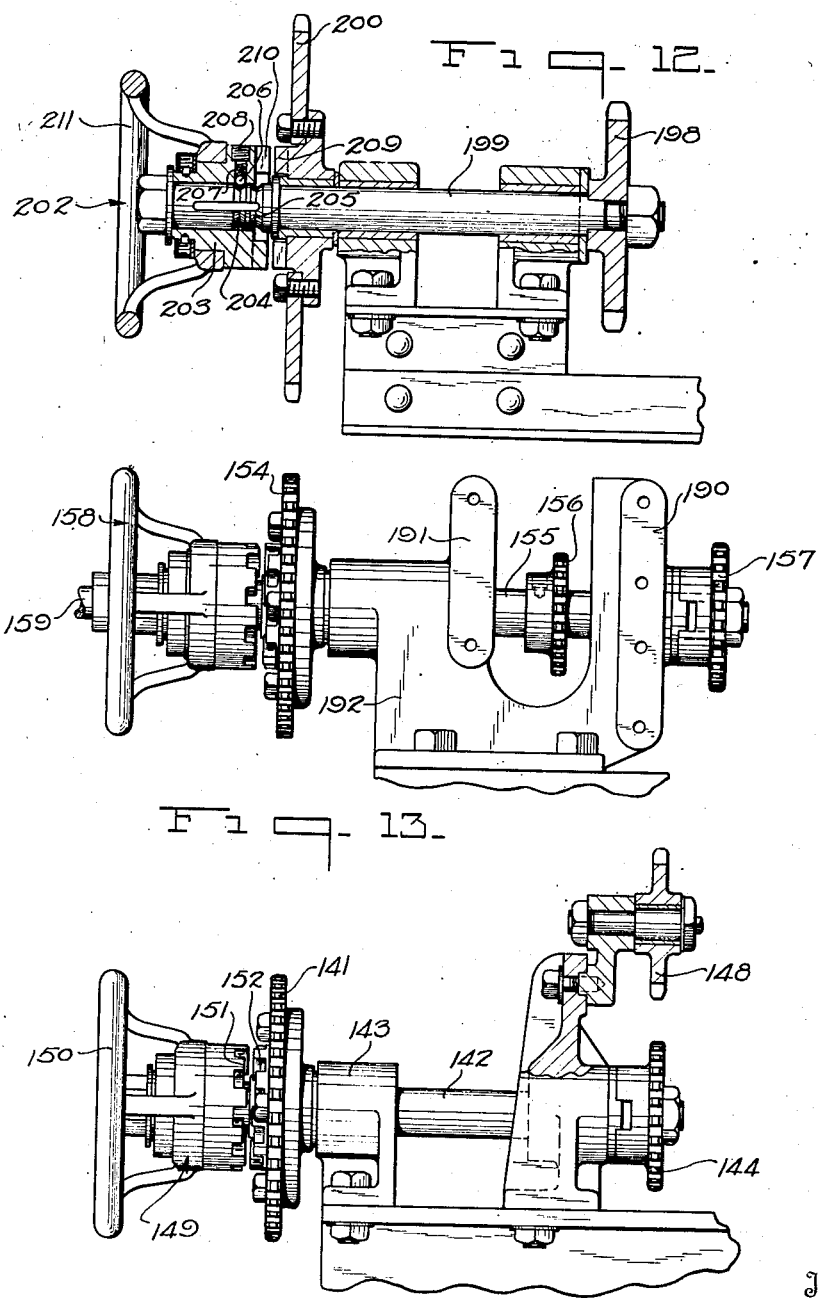

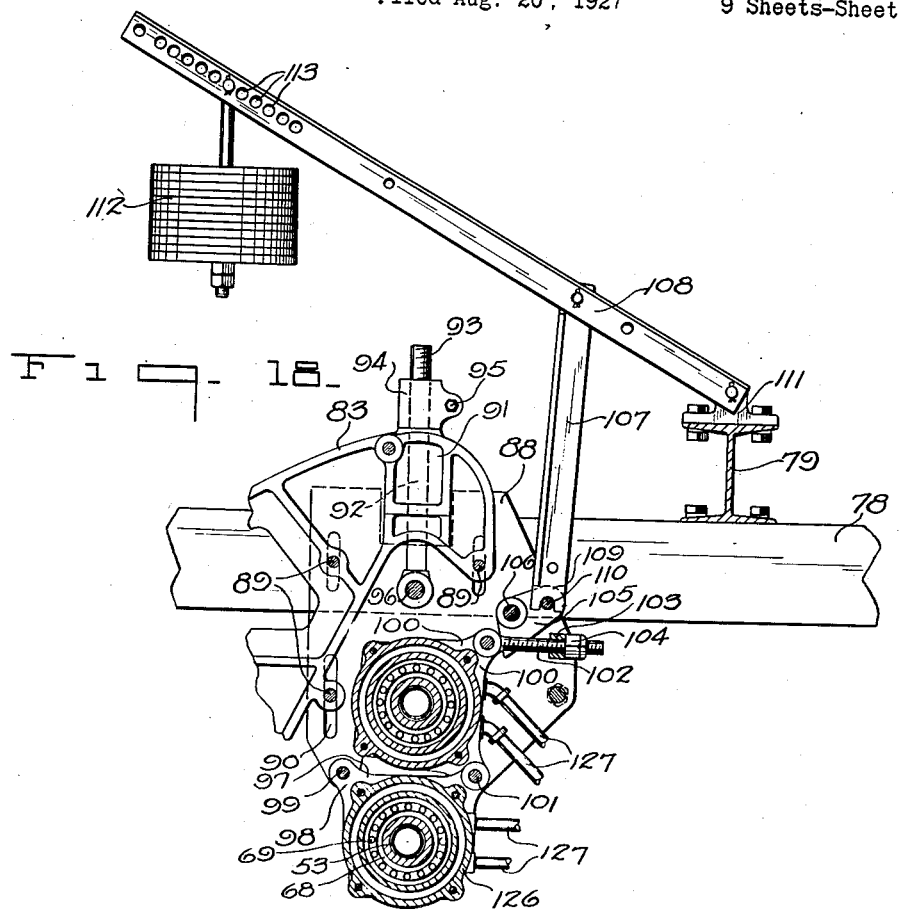

May 10, 1932. J. L. DRAKE ET AL 1,857,809
PROCESS AND APPARATUS FOR PRODUCING SHEET GLASS
Filed Aug. 20, 1927 9 Sheets-Sheet 9
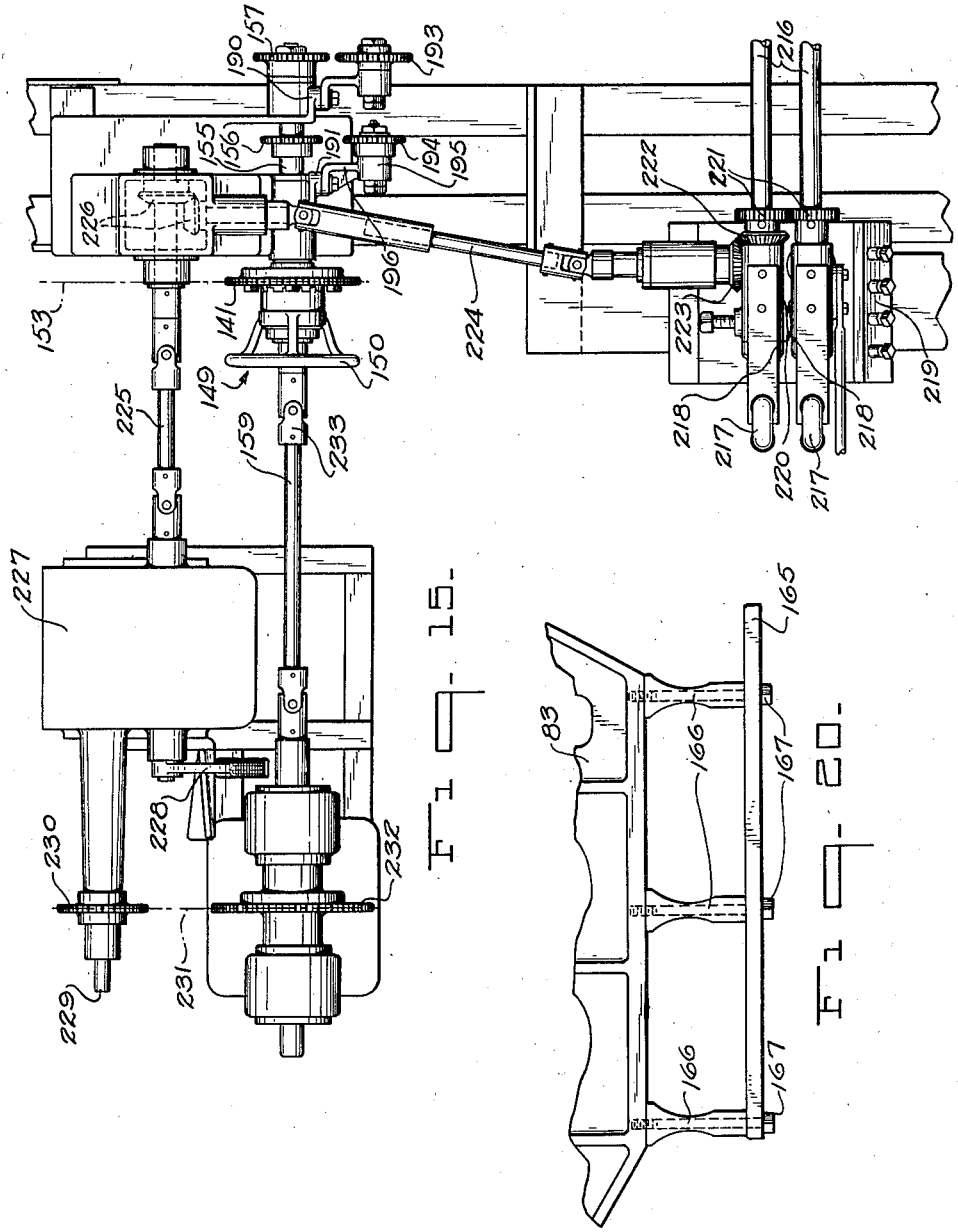
Inventors
John L. Drake
Luke C. Mambourg
By Frank Fraser
Attorney Patented May 10, 1932

1,857,809

UNITED STATES PATENT OFFICE

JOHN L. DRAKE, OF TOLEDO, AND LUKE C. MAMBOURG, OF LANCASTER, OHIO, ASSIGNORS TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed August 20, 1927. Serial No. 214,278.

The present invention relates to an improved apparatus and process for producing sheet glass.

In the type of machine disclosed in the patent to Colburn, 1,248,809, granted December 4, 1917, a sheet of glass is continuously drawn vertically from a mass of molten glass, the sheet being deflected over a bending roll into a horizontal plane, after which it may be suitably flattened and annealed. The thickness of sheet produced with this machine depends upon the temperature of the glass and speed at which the sheet is drawn therefrom. The uniformity of the thickness of sheet is dependent to a considerable extent upon the skill of the operators as no means is provided for actually rolling or otherwise forming or reducing the sheet to predetermined and uniform thickness. By careful handling of the Colburn machine, an exceptionally good quality of glass can be produced particularly for ordinary sheet glass uses. However, it is almost impossible to constantly produce a sheet of absolutely uniform thickness with a single roll, such as is used in the Colburn machine.

In accordance with the present invention, a machine has been developed capable of constantly producing a flat sheet having predetermined thickness which is uniform throughout. A sheet of glass which is of uniform thickness and perfectly flat is extremely desirable as a blank in the production of ground and polished glass usually called plate glass. The flatter and more uniform the thickness of a plate glass blank, the less amount of time is required to grind the same preparatory to polishing, and obviously the shorter the time required for grinding, the less it costs to produce a sheet of plate glass.

An important object of the present invention is to provide a machine adapted for the production of sheet glass having a predetermined and uniform thickness.

Another object of the invention is to provide sheet glass apparatus wherein a mass of molten glass is drawn vertically and passed between rolling surfaces adapted to reduce said mass to a sheet having a predetermined thickness.

Another object of the invention is to provide an apparatus of this nature wherein a pair of rotatable rolls are arranged above a mass of molten glass whereby a sheet may be drawn from said mass, deflected over one of said rolls into a horizontal plane, the rolls being arranged to create a sheet forming pass which produces a sheet of uniform thickness and flatness.

A still further object of the invention is to provide in sheet glass apparatus, a receptacle containing a mass of molten glass which has been properly conditioned, the apparatus including a pair of preferably positively driven rolls arranged above said mass of molten glass and preferably in close proximity thereto, one of said rolls being held in fixed position while the other of said rolls is mounted to permit adjustment with respect to the first roll, whereby any desired thickness of sheet can be produced, the sheet of glass being deflected into a horizontal plane over one of said rolls, preferably the fixed roll, and conveyed through an annealing leer where the sheet is properly annealed.

A further object of the invention is to provide apparatus of this nature comprising a receptacle containing a mass of molten glass which has been properly conditioned, a pair of rotatable rolls arranged above the molten glass and preferably in close proximity thereto, the glass being drawn from said mass up between the rolls and deflected over one of said rolls into a horizontal plane, and edge engaging means for assisting in feeding or advancing the molten glass to the rolls, which rolls are arranged to create a sheet forming pass to reduce the mass to a sheet having a predetermined and uniform thickness.

Still another object of the invention is to provide a machine of this nature wherein a pair of rotatable rolls are arranged above a mass of molten glass, the pair of rolls being adjustable with respect to the mass of molten glass, one of the rolls being normally held in a fixed position, while the other roll is adjustable with respect to the first and free to be separated therefrom when necessary, although it is normally urged toward said first mentioned roll, with adjustable means for limiting the movement of the second roll toward the first, said rolls creating a sheet forming pass whereby a relatively thick mass of molten glass may be supplied to the pass and there reduced to a flat sheet of predetermined thickness.

A further object of the invention is to provide an apparatus and process of this nature wherein a mass of properly refined molten glass is continuously furnished to a working receptacle, while a pair of preferably positively driven rolls are arranged thereover and positioned to create a sheet forming pass therebetween, the handling of the molten glass being such that a relatively heavy mass is furnished to said pass where it is reduced to a flat sheet of predetermined thickness, the glass being deflected from a substantially vertical plane into a substantially horizontal plane where conveying means is provided to support and carry the sheet into an annealing leer.

Other objects and advantages of the invention will become more apparent during the course of the following description when taken in connection with the accompanying drawings.

Figure 8:
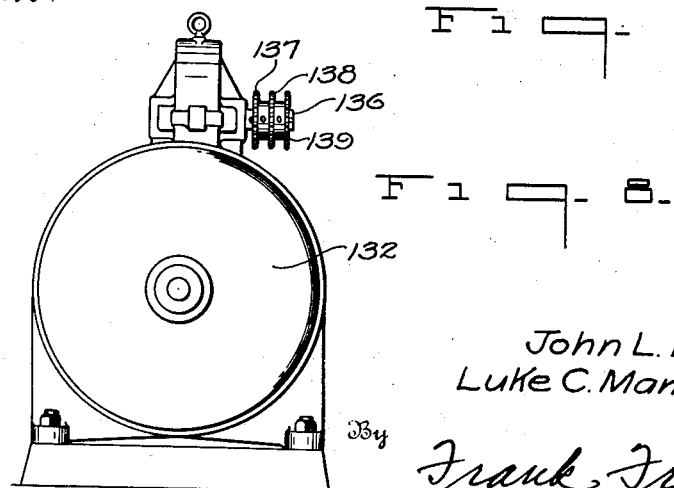

In the drawings wherein like numerals are employed to designate like parts throughout the same, Fig. 1 is a fragmentary vertical longitudinal section through the machine, Fig. 2 is a fragmentary plan view in detail of the rolls when arranged in horizontal position, Fig. 3 is an elevation, partly in section, of the rolls when arranged in vertical position, Fig. 4 is a section taken on line 4—4 in Fig. 2, and looking in the direction of the arrows, Fig. 5 is a section taken on line 5—5 in Fig. 2, and looking in the direction of the arrows, Fig. 6 is a side elevation of the machine showing the rolls in horizontal position and with the knurl drive mechanism removed for the sake of clearness, Fig. 7 is an enlarged detail of one end of the machine showing the driving means, Fig. 8 is an end view of the driving means, Fig. 9 is a section taken on line 9—9 in Fig. 6, Fig. 10 is a section taken on line 10—10 in Fig. 9, Fig. 11 is a section taken on line 11—11 in Fig. 10, Fig. 12 is a sectional detail of the clutch controlling the driving of the sheet forming rolls and taken on line 12—12 in Fig. 6, Fig. 13 is an enlarged detail of the clutch which controls the drive of the conveying rolls, Fig. 14 is an enlarged detail of the clutch which controls the drive of the leer rolls, Fig. 15 is a plan of the knurled rolls drive, Fig. 16 is a sectional detail showing a modified form of construction, Fig. 17 is an enlarged detail showing the sheet forming rolls in a vertical position, Fig. 18 is a section taken on line 18—18 in Fig. 3, and looking in the direction of the arrows, Fig. 19 is a vertical transverse section through one of the lip tiles, and taken on line 19—19 in Fig. 1, and Fig. 20 is a detail of the conveying rolls support.

In the drawings, the numeral 25 designates a tank furnace adapted to contain a mass of molten glass 26. Connected to the tank furnace 25 is a receptacle 27 which is adapted to be constantly supplied with a mass of molten glass 28 from the mass contained in said furnace. Preferably, the receptacle 27 is in the form of a pot and is adapted to contain a relatively more shallow mass of molten glass than that contained in the tank furnace proper, to facilitate a more accurate control of the molten glass, although the invention is not restricted to the depth of this glass. To assist in controlling the temperature of the molten glass 28, the pot or other receptacle 27 is preferably surrounded by a compartment 29 in which are arranged pot stools 30 for supporting the receptacle, while heating means 31 are provided to control the temperature of said pot chamber and thus assist in controlling the temperature of the glass. Although it is not necessary, it is desirable that the heat and gases above the molten glass in the furnace be separated from the heat and gases above the molten glass in the draw pot or receptacle 27, and to this end a preferably adjustable jack arch or curtain wall 32 is provided. The position of the jack arch 32 is not necessarily limited to that illustrated in Fig. 1 of the drawings, as it may be arranged further back in the furnace or nearer the sheet. Normally, it is desired that the lower edge of the adjustable jack arch 32 be arranged relatively close to the surface of the molten glass 26 so that said jack arch will act as a curtain or dividing wall, effectively separating the heat and gases in one part of the furnace from another, but of course the wall is adjustable for different conditions.

Referring to Fig. 1, it will be seen that a pair of rolls 33 and 34, respectively, are arranged above the surface of the mass of molten glass 28. Although the construction and arrangement of the rolls will be more fully described hereinafter, the purposes of the rolls will be set forth here.

It is preferable that the rolls 33 and 34 be arranged in a horizontal position such as shown in Fig. 1, which means that a line drawn through the axes of the two rolls will be horizontally disposed as compared with the construction shown in Fig. 17 where the rolls 35 and 36 are arranged in a vertical position. The rolls 33 and 34 are preferably positively driven and in such a manner that after a sheet has been started by the use of a bait or other means as is well understood in the art, a relatively thick mass of glass 37 will be drawn or moved vertically from the pot. The numeral 38 designates the sheet which has been formed from the mass 37 after it has passed between said rolls. The rolls 33 and 34 are adjustably mounted to permit the production of any desired thickness of sheet, and are arranged to create a sheet forming pass as is clearly shown in Fig. 1, which directly controls the thickness of sheet produced. The mass 37 is of sufficient thickness to supply the necessary amount of glass to the sheet forming pass to permit an actual rolling or reduction in thickness, so that the finished sheet has a thickness less than that of the mass 37. The heavy body of glass 37 may be created by proper temperature regulation and control of the molten glass 28, and also by the speeds of the machine. To further assist in building up a requisite body of glass 37, edge engaging rolls 39 may be used.

The roll 33 is preferably normally held in a fixed position, while the roll 34 is adjustably mounted with respect to the first mentioned roll. It will be seen that the sheet 38 is deflected from a vertical into a horizontal plane over the roll 33, and it is also to be noticed that the space between the peripheries of the rolls 33 and 34 at their closest point of approach is the controlling factor in the thickness of the sheet produced. In other words, the thickness of sheet produced is the same as the space between the rolls. Further, it will be noted that if sufficient glass is fed to the rolls, and with the present invention such is the case, the finished sheet will be of uniform thickness throughout, which thickness is also predetermined by the proper adjustment of the roll 34 with respect to the roll 33. The sheet 38 is carried on conveying rolls 40 which convey the said sheet to an annealing leer 41 in which may be arranged supporting and conveying rolls 42. To prevent buckling or warping of the sheet after it has been formed, the rolls 43 may be brought into engagement with said sheet and if used are preferably arranged in vertical alinement with the leer rolls 42. The rolls 43 may be permitted to idle, being driven due to frictional contact with said sheet. Their weight is preferably such that there is no tendency toward a reduction in thickness of the sheet, but act merely as a means for preventing buckling or warping of said sheet.

To assist in properly conditioning the molten glass 28 and to protect the mass 37 and sheet 38, a lip tile 44 supported on a suitable bracket 45 is used. A cooler 46 is associated with the lip tile in the manner shown in Fig. 1, and prevents heat and gases from striking the rolls 33 and 34, and also from striking and injuring the sheet 37. On the opposite side of the sheet a specially constructed lip tile, designated in its entirety by the numeral 47, is used. In Fig. 19 is shown in detail, the construction of the lip tile 47, and it will be seen that the tile is formed from a plurality of sections provided with cooperating tongues 48. The lip tile is supported on suitable spaced refractory blocks or other supports 49 resting on the end of the pot 27, the supports 49 preferably being arranged at the juncture of the sections of said tile. Due to the construction of the tile and the method of mounting the same, it is possible to have the sheet 38 in its horizontal run arranged relatively close to the surface of the molten glass 28 which permits the use of the rolls 33 and 34 in the positions illustrated in the drawings. With the old type of tiles commonly used, it is practically impossible to use the present arrangement for producing sheet glass satisfactorily. Cooperating with the tile 47 is a heat absorbing shield 50.

In Figs. 2, 3 and 5 is shown the way in which the temperature of the rolls 33 and 34 is controlled. For the sake of clearness in Fig. 3, the rolls have been arranged in a vertical position such as disclosed in Fig. 17. The lower roll is numbered 35 and the upper roll 36. Each of the rolls used to create a sheet forming pass is provided with a cylindrical body 51 which may be formed from steel, cast iron, or any of the non-corrosive metals such as nichrome, monel, stellite, etc., and also including chromium plated rolls. Where the finished blank is to be used for plate glass purposes, the quality of the finish or surface on the sheet produced is not of considerable importance. As above pointed out, the important factor in the production of plate glass blanks is the question of thickness and flatness. However, by suitably polishing the rolls, it has been found that an exceptionally good surface is produced on the sheet, and if sufficient care is exercised in the production of the sheet by eliminating the possibilities of dirt, etc., the sheet can be used without surfacing in a great many instances.

The cylindrical bodies or shells of the rolls are carried by suitable end pieces 52, and as shown in the lower roll 35 in Fig. 3, the end pieces are screw-threadedly associated with the cylindrical body portions 51. The bracket supports for the end pieces will be more fully described hereinafter. Arranged in each of the rolls 35 and 36 is a preferably perforated pipe 53 which may be supported at its ends in the reduced portions 54 of the end pieces 52. Arranged around the end pieces 52 as shown in Fig. 3, and at each end of each roll, is a pair of annular chambers 55 and 56 respectively, each chamber being separated from the other. Interposed between the chambers 55 and 56 are packing carrying members 57 which are fixed in a manner to rotate with the rolls and associated parts, and contain suitable packing material 58 cooperating between the roll and the compartments. The compartments of the two rolls are provided with the ears 59, permitting said compartments to be clamped together by means of the bolts 60 as shown in Fig. 2, while relatively large ears 61 are provided to permit locking of the compartments together as shown in Fig. 5 by means of a pin 62 passing between the ears 61, so that the compartments will not rotate, thus permitting their connection to suitable conduits.

The ends 52 of the rolls are provided with openings 63 communicating with the compartments 55 and 56 respectively. Of course, there are openings also in the packing members 57 in alinement with the compartments and openings in the rolls as shown clearly in Fig. 5. A conduit 64 is connected to each compartment permitting a temperature control medium to be introduced within or removed from each compartment as the case may be. The medium passes into the compartment through the openings 63 into the interior of the roll. As shown in Fig. 3, in the upper roll, a partition 65 is arranged to separate the compartment 55 from the compartment 56. Some of the temperature control medium coming from the compartment 55 will enter the opening 66 of the conduit 53 and pass through the exits or apertures 67, while some of the medium will find its way toward the left hand end of the roll passing between the pipe and the inner end of the reduced portion 54, there being a slight clearance as shown in Fig. 3. This flow of medium is provided to cool the lower raceway 68 of the bearing 69. The medium then finds its way to the end of the roll, and is permitted to pass into the end 70 of the conduit and thence toward the apertures 67. The incoming medium is discharged through the apertures 67 and permitted to contact with the inner walls of said rolls. The medium is withdrawn from the interior of the rolls at the left hand end of the rolls as shown in Fig. 3 through the compartment 56, so that there is a continuous circulation of cooling medium. A similar construction is arranged at each end of both rolls so that the temperature of the rolls can be properly maintained and adjusted as desired. The packing material 58 of course prevents leakage of the medium between cooperating parts of the rolls and the stationary compartments which act to convey the cooling medium to and from the machine.

To prevent accidental displacement of the end piece 52 with respect to the cylindrical portion 51 of the rolls, a set screw or a plurality of set screws 71 are arranged as shown in Fig. 3. Further, the retaining rings 72 and 73 respectively are provided, and it will be seen that the rings or flange members will also act to prevent the escape of the molten glass from between the rolls at the ends thereof. In other words, the rings will form a confining member for the ends of the slot or sheet forming pass created between the pair of rolls. Carried by the ends of each roll is a sprocket 74 which is suitably keyed to the rolls so that upon rotation of the sprockets, the rolls will likewise be rotated. Screwthreaded plugs 75 are arranged at the ends of the rolls to permit access to the interior thereof when desired, while the plugs prevent the escape of the cooling medium when the rolls are in use.

Referring to Fig. 6, the numeral 76 designates vertical standards. An extension 77 is carried by the standards 76 and is adapted to support one end of each channel iron 78. Similar standards 76 are arranged on both sides of the machine, and a pair of channel irons 78 are arranged longitudinally of the machine as shown in Fig. 6. Arranged transversely of the machine and supported on the channel irons 78 are transverse I-beams 79 and 80 which are in spaced relation, while a brace 81 is connected between the transverse beams 79 and 80 and suitably bolted thereto. To prevent accidental displacement of the transverse beams 79 and 80, they are bolted by means of the bolts 82 to the supports 78. Connected to the supports 78 is a casting 83 having at one end the supporting portion 84 which is adapted to rest on a plate 85 carried by a member 86 adapted to straddle one of the conveying rolls 40. An upstanding pin 87 is carried by the member 86 and is adapted to be received in a suitable opening formed in the casting 83 to prevent accidental displacement of said casting and associated parts, and to also properly aline the same. Similar supporting members 86 are arranged on both sides of the machine. The opposite end of the casting 83 is formed as shown in Fig. 18. Carried by the members 78 is a pair of similar plates 88 which are held in spaced relation by means of the casting 83 interposed therebetween. Bolts or suitable shafts 89 extend through the plates 88, channel irons 78, and casting 83, the said shafts passing through suitable slots 90 formed in said plates, the slots limiting the vertical adjustment thereof. As clearly shown in Fig. 3, a pair of supporting beams 78 is arranged on each side of the machine, and as the construction of both sides is the same a description of one will suffice. Attention is also called to the fact that there are two casting similar to the casting 83 shown in Fig. 6.

Formed on each casting is a sleeve 91 through which is movably mounted a vertically adjustable shaft 92 terminating in the threaded end 93 adapted to receive a threaded collar 94 screw-threadedly mounted on the threaded end of the shaft and held in adjusted position by means of a lock bolt 95. The collar 94 bears upon the upper end of the sleeve 91, which in turn is supported by means of the extensions 91a resting on the members 78. Carried by the lower end of the shaft 92 is a stub shaft 96, the ends of which are adapted to be received in suitable openings formed in the plates 88, the weight of the plates 88 and associated parts being supported by the shaft 92, which in turn transmits its weight to the casting 83 and angle irons 78. By suitably adjusting the shaft 92 vertically, the plates 88 can be adjusted vertically within the limits set by the slots 90 therein.

As shown in Fig. 18, the rolls are arranged in a vertical position. In this instance the lower roll is held in fixed position, while the upper roll is adjustably mounted whereby to control the size of the sheet forming pass created between said rolls. The lower roll, as shown in Figs. 3 and 18, is supported in a hanging bracket 97, the bracket 97 being supported by means of the ears 98 through which extend the pins 99. As the pins 99 are received in openings in the plates, no adjustment is provided except through movement of the entire plate. In other words, there is no relative movement between the support for the lower roll and the plates 88. The upper roll is carried by a similar bracket 100 which is pivotally mounted on the pin 101 which is also preferably one of the mounting pins for the lower roll. The bracket 100 for the upper roll is pivotally associated with a threaded shaft 102 operable through a suitable guide 103, the shaft having arranged on its opposite end to that of the pivot point, an adjusting nut 104. By suitably adjusting the nut 104, the upper roll can be moved with respect to the lower roll. It will be seen that the adjustment of the nut 104, due to the fact that the nut bears against the fixed member 103, that movement of the upper roll toward the lower roll is restricted to said adjustment. However, it has been found that there is a tendency for the rolls to separate due to the relatively thick mass of molten glass passing therebetween. It is desirable to permit separation of the rolls in some instances, where, for instance, a piece of clay or other foreign matter finds its way into the molten glass and is drawn upwardly thereby. Of course in such instances, it is desirable to permit a separation of the rolls so that the foreign substances can pass therebetween without causing injury. On the other hand, it is necessary to the production of a uniform thickness of sheet that the rolls normally be held in their proper adjusted relation as otherwise the thickness of the sheet would vary, depending somewhat upon the plasticity of the glass. To normally urge the rolls toward each other, means has been provided to exert a pressure on the movable roll, which, in Fig. 18, is the upper roll.

To this end a cam 105 is pivotally mounted between the plates 88 on the pin 106. An upstanding member 107 pivotally connected to an arm 108 is provide with a forked end 109 supported on a pin or shaft 110 carried by the cam 105. The arm 108 is pivoted to the means 111 fixed on the I-beams 79, while the opposite end of the arm 108 is adapted to receive a weight member 112. It will be seen that a plurality of apertures 113 have been formed in this end of the arm 108, thus permitting adjustment of the weight along said arm, while at the same time the heaviness of the weight itself can be controlled. It will be seen that with this construction the weights normally urge the upright member 107 downwardly, which in turn rocks the cam about its point of suspension 106, so that the lower portion of the cam bears against the support for the upper roll and tends to push it toward the lower roll, about its point of pivotal support 101.

In Fig. 4, the construction is slightly modified to accommodate the horizontally arranged rolls. In this instance the left hand roll, which is the stationary roll and over which the sheet is deflected, is supported by the bracket 114 permanently fixed to the plates 88. The second roll is carried in a bracket 115 pivotally supported on the rod 116. The shaft 117 is pivotally connected to the bracket 115 on the rod 118, said rod 117 passing through the fixed but rotatable bracket 119, while the adjusting nuts 120 permit the desired adjustment. The upstanding member 121 has a forked end supported directly on the shaft 118, while the upstanding member 121 is normally urged downwardly by means of the cross arm 122 pivotally connected thereto, supported at its end 123, and having the weight members 124 connected thereto. In both constructions, it will be seen that one roll is normally urged toward the other, and the weight is sufficient to normally hold the rolls in the desired position so that a constantly uniform sheet of predetermined thickness is formed. In other words, the weights exert sufficient pressure on the adjustable roll to normally hold the same as close to the stationary roll as the adjustment thereof permits, which adjustment therefor controls the thickness of sheet produced. When it is desired to adjust the rolls as a unit up or down, the bolts passing through the plates and supported on the supporting members 78 are loosened, and the adjusting collar 94 properly handled.

As shown in Figs. 2 and 3, means are provided for properly cooling or preventing the overheating of the bearings 69, and to this end passage ways 125 are formed in the members 126, the members being identical in all places when used.

In Fig. 2, a portion of the members 126 is cut away to show how the passages in the members are arranged. It will be seen that the passages, which are really a single tortuous passage, terminate in closed ends, one end of which acts as an intake end, while the opposite end acts as an outlet end, each end connecting to suitable conduits 127 shown in Fig. 2. The cooling medium is introduced at one dead end of the passage through one of the conduits 127, and passes completely around said member 126, crossing over from one side to the other through the diagonal passage 128. It will thus be seen that a continuous circulation of cooling medium can be had around the interior of the members 126 to properly cool the upper raceways for the bearings 69. The members 126 do not rotate with the roll. Suitable packing 129 is carried by the roll brackets, and in this manner lubricant can be arranged within said brackets for the bearings 69. Sleeves 130 are arranged on the end of the shaft and abut against the lower raceway of the bearing to prevent displacement thereof, said sleeve being held in position by means of a set screw or the like 131, or if it is desired the sleeve 130 can be provided with screw threads, while the shaft can be threaded as 133'. In this instance, recesses 134' are formed in the sleeve to permit adjustment thereof by means of a wrench.

Fig. 7 shows the driving means for the machine, and if this drawing is placed to the left of Fig. 6, it will act as a continuation thereof and give a clear idea of the manner in which the various parts of the machine are driven. The numeral 132 designates a motor which is driven by any suitable source of power. The motor carries a gear 133 meshing with the second gear or pinion 134. The gear 134 is carried on a shaft extending within a speed reducing box 135 as will readily be understood. Extending from this box is a shaft 136 carrying three sprockets as shown in Fig. 8. The sprocket 137 nearest the box is used to drive the leer rolls, the middle sprocket 138 is used to drive the conveying roll, while the outer sprocket 139 is used to drive the sheet forming rolls. The inner sprocket has trained thereover a sprocket chain 140 shown in Fig. 7, which is trained over a sprocket 141 shown in Fig. 14. The sprocket 141 is carried on a shaft 142 arranged in the journals 143, the said shaft carrying a second sprocket 144 at its opposite end and over which the sprocket chain 145 in Fig. 7 is trained. The sprocket chain 145 passes over suitable sprockets 146, a sprocket being carried by the end of each leer roll 42, whereby to drive the same. A chain tightener 147 may be associated with each leer roll as shown in Fig. 7, whereby to prevent displacement of the sprocket chain with respect to the sprockets. A main chain tightener 148 is also used and is shown in Figs. 7 and 14. To control the operation of the leer rolls, a clutch 149 is provided which may be moved into and out of engagement by means of a handle 150. The handle portion of the clutch carries a plurality of teeth 151 which mesh with the teeth 152 associated with the sprocket 141 when it is desired to drive said leer rolls.

The sprocket 138 drives a sprocket chain 153, which in turn drives the sprocket 154 shown in Fig. 13. The sprocket 154 is loosely mounted on a shaft 155 which also carries sprockets 156 and 157 respectively. A clutch member 158 is keyed to the shaft 155. A shaft 159 is provided as an extension for the shaft 155, as will be more fully described hereinafter. To operate the shaft 155, the clutch 158 is moved into engagement with the teeth carried by the sprocket member 154. The sprocket 156 drives sprocket chain 160, which in turn drives a sprocket 161 shown in Fig. 11. The sprocket 161 drives the gear 161a which meshes simultaneously with gears 162 as in Fig. 10, whereby to drive the upper rolls 163 shown in Fig. 1. The rolls 163 in Fig. 1 are illustrated in a raised position and out of contact with the sheet of glass 38. The rolls are constantly rotated when the machine is in operation to prevent warping due to the heat. When it is desired to use the rolls, they are lowered into position and adapted to contact with the sheet. These rolls may be used to prevent buckling of the sheet and to also assist in conveying the same from the rolls and over the lower conveying rolls 40, but as is above pointed out the pressure exerted by the rolls 163 is so controlled that they do not cause any reduction in the thickness of the sheet. The conveying rolls 40 are rotatably supported in the journals 164 mounted on a plate 165 suspended from the casting 83. Spacers or brackets 166 are used to support the plate 165 and are connected to the casting 83 by means of the bolts 167. The upper rolls 163 are carried by movable bolts 168, shown in Fig. 9, which carry the journal 169 in which the rolls are rotatably supported. The upper end of the bolts 168 are pivotally associated with a pivoted arm 170, the opposite end of said arm carrying a weight 171. A catch 172 is carried by the arm 170 and may engage one of the supports 78 to hold the rolls 163 in an elevated position and out of contact with the sheet. When it is desired to use the rolls, the catch 172 is disengaged from the support 78 and the roll will be lowered. The weights 171 are used to counter-balance the weight of the rolls and to thereby vary the amount of pressure exerted upon the sheet. The guards 173 are used to enclose the rolls and to form substantially a closed compartment through which the sheet passes.

The gear 161a is carried on a shaft 174 which extends through a journal 175 carried by the casting 83, while the sprocket 161 is arranged on the opposite side of said casting. Thus the gear 161a and the gears 162 are arranged on the inside of the casting while the power is connected on the outside thereof.

The conveyor rolls may be asbestos covered if desired, but we prefer that they be formed of a suitable metal and comprise preferably a cylindrical shell 176 supported on a roll 177 journaled at its ends in suitable bearings. The outer shell may be spaced from the inner portion of the roll, particularly in those cases where they are formed from different material, to allow for expansion and contraction. In such instances, the two may be joined together by means of set screws or the like. Arranged longitudinally through the roll is a perforated pipe or conduit 178 extending beyond the ends of said rolls. A supply conduit 179 is used to introduce a cooling medium such as air within the rolls to prevent overheating thereof, and also to accurately control their temperature. When air is used, it passes from within the perforated pipe 178 to the interior or bore of the roll, and is then allowed to pass outwardly toward the ends of the rolls between the pipe 178 and the roll where the air escapes. If a liquid is used, some means is provided to convey the same from the rolls. The lower rolls or conveyor rolls, which are designated in their entirety by the numeral 40, are driven by means of a sprocket 180 carried by a sleeve 181 rotatable in the bearing support 182, the support being held against accidental displacement by means of the screw 183 passing through the plate 165. The inner end of the sleeve 181, which is the end opposite to the sprocket 180, is provided with a bayonet slot 184 in which is received a pin 185 carried by the roll 40. The sprocket of each of the rolls is driven by means of a sprocket chain 186 shown in Fig. 6, which in turn is driven by the sprocket 157 shown in Fig. 13. The bayonet slot is so arranged that when the sprocket of each roll is driven, there will be a tendency to tighten the pin within the slot so that there will be no accidental displacement. The sleeve is held in position in the journal by means of the annular flange 188 on one side and the lock collar 189 on the opposite side thereof. As shown clearly in Fig. 6, the entire group of conveyor rolls are driven from a single sprocket and by a single sprocket chain, although of course a plurality of drives may be provided and the rolls driven at progressive increasing speeds to place the sheet under a slight tension.

The numerals 190 and 191 designate portions on the bracket 192 shown in Fig. 13, where suitable idler sprockets may be used to give the proper tension to the chain 186. In Fig. 6, the idlers have not been shown for the sake of clearness, but in Fig. 15, the numerals 193 and 194 respectively show the idler sprockets mounted in position, each sprocket being carried by a suitable journal 195 carried on an arm 196 bolted to the portions 190 and 191 respectively.

As has been pointed out, a sprocket 74 is carried by one end of each of the sheet forming rolls, and as is clearly shown in Fig. 6, a single sprocket chain 197 is trained about both sprockets, the said chain deriving power from the sprocket 198 shown in Fig. 12. This member is carried on a rotatable shaft 199 which is driven by means of the sprocket 200, which in turn derives its power from a sprocket chain 201 driven by the sprocket 139 shown in Fig. 8. A suitable clutch, designated in its entirety by the numeral 202, is used to control the drive of the rolls. The clutch 202 is similar to the clutch shown in views 13 and 14, and it will be seen that it comprises a portion 203 slidably mounted on the end of the shaft 199. Grooves 204 and 205 are formed in the shaft 199 and create pockets for receiving a spring-pressed ball 206 normally urged toward the shaft by spring 207, while a plug 208 is used to retain the same in position. The sprocket 200 is mounted for free rotation on the shaft 199 and is provided with teeth 209 which mesh with similar teeth 210 on the member 203 when the clutch has been thrown into operation. To rotate the shaft 199 and associated parts, the wheel 211 of the clutch is pushed inwardly causing the ball to ride over from the groove 204 to the groove 205, while at the same time the teeth 210 intermeshing with those carried by the sprocket cause a positive rotation of the shaft 199 as the clutch 203 is keyed to said shaft. The ball will prevent accidental displacement of the clutch member.

To provide the necessary room for operating the rolls, for examination of the glass and also for the mechanism required to operate the rolls 39, the sprocket chain passes around an idler sprocket 212 arranged in an offset position as shown in Fig. 6. A chain tightener 213 is also shown in Fig. 6 and is used to hold the sheet tight by means of the weight 214 associated therewith. In view of the manner in which the same chain is trained over both sprockets 74 of the sheet forming rolls, it will be seen that the rolls are positively rotated in opposite directions which is the condition desired in the formation of a sheet of glass.

Hook members 215, shown in Fig. 6, are provided to permit the sheet forming rolls and conveyor rolls to be lifted from an operative position by means of a crane or the like. This is easily accomplished as nothing but the weight of the machine holds it in position except for the pins 87 which prevent accidental displacement. However, the chains are first removed from their respective sprockets, and this may be done by removing a link from each chain, or other means as will be readily understood.

As shown in Fig. 1, edge engaging rolls 39 are provided to assist in building up the relatively heavy thick mass of glass 37. These rolls preferably engage the edges only, and may be knurled or not as desired. The rolls 39 are carried upon the ends of shafts 216 shown in Fig. 15. These shafts are hollow and have passing therethrough a cooling medium introduced by means of the conduits 217. Any type of temperature control medium may be circulated through the shafts and rolls 39. These rolls are preferably cooled to prevent injurious sticking of the glass thereto, and are used primarily for feeding the glass upwardly and for maintaining the sheet to the desired thickness. The shafts 216 are carried by the supports 218 which are mounted upon the adjustable base 19. One of the supports 218 is arranged in fixed position while the other is pivotally mounted, while a resilient member 220 is used to force the rear ends of the shaft apart which tends to move the rolls toward each other when in operative position. This gives the necessary gripping of the molten glass but also permits the separation thereof to allow the passage of clay or other foreign matter when necessary. Each of the shafts 216 has keyed thereto a gear 221, the gears of the two shafts meshing and having teeth sufficiently long to permit engagement thereof, even though the shafts move to and from each other. A drive pinion 222 is carried by one of the shafts and is adapted to rotate the same, thus causing the rotation of both shafts in opposite directions because of the pinions or gears 221.

The bevel gear 222 derives its power from a bevel gear 223 carried on a shaft 224, which in turn is driven from a shaft 225 through the intermediary of the bevel gears 226. The shaft 225 is connected to a transmission 227 controlled by operating lever 228 so that the rolls 39 may be driven at any desired speed, the speed usually depending upon the thickness of sheet being produced. The numeral 229 designates a drive shaft which acts as a source of power for the transmission 227, and has keyed thereon a sprocket 230 meshing with a chain 231 driven by means of a sprocket 232. The sprocket 232 is carried on the shaft 159 which is also illustrated in Fig. 13. Suitable universals 233 are provided in all of the shafts as will be readily understood.

In Fig. 16 is shown a slight modification wherein the rolls 234 and 235 respectively are arranged relatively closer to the surface of the molten glass 236 than are the rolls 33 and 34 shown in Fig. 1. In this embodiment of the invention, it is not desirable to use the rolls 39. Of course it is to be understood that it is not absolutely necessary that the rolls 39 be used in the arrangement shown in Fig. 1, although their use is preferable. However, in Fig. 16, in view of the close proximity of the rolls to the surface of the molten glass and the short distance which the large mass 237 is drawn, the use of such rolls is not desirable, although obviously, the rolls 39 or similar devices can be used. The mass in Fig. 16 is drawn vertically and reduced to a sheet of uniform thickness, which thickness is dependent upon the distance between the rolls. It will also be seen that the sheet is deflected over one of the rolls to a horizontal plane.

In Fig. 17 is shown still another form of the invention, wherein the rolls are arranged in a vertical position, and it will be seen that a relatively heavy mass 238 is drawn upwardly and deflected so that the sheet is really formed in a horizontal plane and then carried away in the same plane. In other words, whereas in Figs. 1 and 16, the sheet is formed in a vertical plane and then deflected, in Fig. 17 the mass is drawn vertically and deflected, after which the sheet is actually produced.

In operation, the machine, comprising the frame formed from the I-beams and angle irons which support the sheet forming rolls and conveying rolls is placed in position by means of a crane or other conveying device engaging the hook eyes 215, and after the machine has been put in position, the sprocket chains are trained over their respective sprockets. After the molten glass has been properly conditioned and allowed to flow into the draw pot 27, a suitable bait or other means may be used to start a sheet. At first the sheet may run a little thin until the proper thickness or mass 37 has been built up. This mass is built up by proper manipulation of the machine and temperature control of the molten glass. As has been pointed out, this is primarily a rolling machine and not merely a flattening device for a sheet of glass. As it is a rolling machine it is therefore desirable to actually roll a mass or a relatively heavy body of glass from one thickness to a lesser thickness. In this way, it is assured that a uniform flat sheet of predetermined thickness can be produced. The pivoted roll, which in Fig. 1 is roll 34, is adjusted by the arm or rod 117 shown in Fig. 4, so that the space between the rolls will give the desired thickness of sheet. The pressure applied to the roll is then adjusted by adding or subtracting the weights 124 as has been explained. The glass will then be drawn upwardly and reduced to a sheet of uniform thickness which is also predetermined. As the sheet is deflected over the roll 33 in Fig. 1, it is conveyed on the rolls 40 to the annealing leer. In some instances it may be advisable to apply more tractive force to the sheet than that created by the conveying rolls 40, and in this event the positively driven rolls 163 may be lowered into position, but the weight exerted by the rolls 163 is preferably controlled so that there is no actual reduction in thickness of the sheet 38. If it is desired, the rolls 43 may also be used, and these are preferably idler rolls which merely rest upon the sheet to prevent buckling or warping thereof. Of course, the positively driven rolls 163 will also prevent buckling and warping when they are in use. The sheet is then conveyed through the annealing leer and properly annealed to permit its commercial use.

By the use and proper adjustment of the jack arch 32, the temperature of the glass in the pot 27 can be accurately controlled. Thus, if the glass in the pot has a tendency to become too cool, the jack arch may be raised, and vice-versa. Also by supporting the improved construction of lip tile illustrated in Fig. 19, on the blocks 49, it is possible to properly heat the glass in the closed end of the pot, and this is essential due to the closeness of the sheet forming rolls and conveying rolls to the glass. It will be seen that the sheet forming rolls are cooled to the extent that the glass will not stick thereto, and thus will absorb a certain amount of heat from the glass in the pot. However, with the type of lip tile illustrated and its manner of support, it is an easy matter to control the temperature of the glass in the pot properly.

Due to the method of support of the rolls, namely the plates 88 shown in Fig. 4, the said rolls can easily be adjusted vertically to assist in building up the desired heavy mass of molten glass 37, and in some instances it may be desirable to operate the rolls relatively closer to or further from the molten glass than in others.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a mass of molten glass, a pair of forming rolls disposed thereabove and adapted to draw a relatively heavy body of molten glass upwardly and reduce it to a sheet of substantially predetermined thickness, with one of the rolls acting as a bending roll for deflecting the sheet from the vertical to the horizontal, a plurality of horizontally arranged conveyor rolls for receiving the sheet and carrying it forwardly, a roll arranged above the sheet and cooperating with one of the conveying rolls for preventing warping of said sheet, journals within which the opposite ends of said roll are mounted, vertical bolts carrying the journals at their lower ends, a rocker arm to which the upper end of each bolt is pivotally connected, a counterweight carried by each arm, and a catch also carried by each arm for holding the roll in an elevated position and out of contact with the sheet.

2. In sheet glass apparatus, a receptacle containing a mass of molten glass, a pair of forming rolls arranged thereabove and adapted to draw a relatively heavy body of molten glass upwardly from said mass and reduce it to a sheet of substantially predetermined thickness, a fixed plate located at each end of the rolls, means for rigidly securing one of said rolls to said plates, means for pivotally mounting the other roll to said plates, linkage mechanism associated with the pivotally mounted roll for exerting pressure thereupon to urge it about its pivot toward the fixed roll, and means carried by the plates and connected to the pivotally mounted roll for limiting the movement of said roll toward the fixed roll.

3. In sheet glass apparatus, a receptacle containing a mass of molten glass, a pair of forming rolls arranged thereabove and adapted to draw a relatively heavy body of glass upwardly from said mass and reduce it to a sheet of substantially predetermined thickness, each of said rolls comprising a hollow cylindrical body portion, end pieces secured within the opposite ends of said body portion, a perforated pipe extending through said body portion and supported at its ends in the end pieces and having an opening adjacent each end, a pair of annular chambers encircling each end piece and being separated from one another, said end pieces being provided with openings communicating with said chambers, and means for introducing a temperature control medium into one of said chambers whereupon it will pass therefrom and enter the perforated pipe through said opening after which it will pass from said pipe through the perforations therein into the body portion of the roll and thence outwardly through the other chamber.

4. In sheet glass apparatus, a receptacle containing a mass of molten glass, a pair of internally cooled rolls disposed thereover and arranged to create a sheet forming pass, one of said rolls being supported in a stationary mounting, a mounting for the second roll pivotally connected with the first mentioned mounting for adjustably supporting the second roll, and means for controlling the space between said rolls.

5. In sheet glass apparatus, a receptacle containing a mass of molten glass, a pair of internally cooled rolls disposed thereover and arranged to create a sheet forming pass, one of said rolls being supported in a stationary mounting, a mounting for the second roll pivotally connected with the first mentioned mounting for adjustably supporting the second roll, means for normally urging the second roll toward the first roll, and means for controlling the space between said rolls.

6. In sheet glass apparatus, a receptacle containing a mass of molten glass, a pair of rolls mounted thereover and arranged to create a sheet forming pass, one of said rolls being supported in a stationary mounting, a mounting for the second roll pivotally connected to the other mounting, means for controlling the space between said rolls, said sheet being deflected over one of the rolls, and means for conveying the sheet laterally away from the roll over which the sheet is deflected.

7. In sheet glass apparatus, a receptacle containing a mass of molten glass, a pair of rolls mounted thereover and arranged to create a sheet forming pass, one of said rolls being supported in a stationary mounting, a mounting for the second roll pivotally connected to the other mounting, means for controlling the space between said rolls, said sheet being deflected over one of the rolls, and means for conveying the sheet laterally away from the roll over which the sheet is deflected and for placing the sheet under slight tension to prevent sagging.

8. In sheet glass apparatus, a receptacle containing a mass of molten glass, a pair of internally cooled rolls mounted thereover and arranged to create a sheet forming pass, one of said rolls being supported in a stationary mounting, a mounting for the second roll pivotally connected to the other mounting, said sheet being deflected over the stationary roll into a horizontal plane, means for drawing the sheet laterally away from said roll, and means for controlling the space between said rolls.

9. In sheet glass apparatus, a receptacle containing a mass of molten glass, a pair of rolls mounted thereabove and arranged to create a sheet forming pass, one of said rolls being supported in a stationary mounting, a mounting for the second roll pivotally connected to the other mounting, means for controlling the space between said rolls, and two pairs of rolls arranged between the first mentioned rolls and the mass of molten glass adapted for engagement with the border portions of the body of glass passing from said mass to said sheet forming pass.

Signed at Toledo, in the county of Lucas, and State of Ohio, this 18th day of August, 1927.

JOHN L. DRAKE.

Signed at Lancaster, in the county of Fairfield, and State of Ohio, this 17th day of August, 1927.

LUKE C. MAMBOURG.